June 19, 1928.

J. MOSCRIP 1,674,606

GRAPEFRUIT CORER

Filed May 31, 1927

Inventor
JOHN MOSCRIP

By Lester L. Sargent
Attorney

Patented June 19, 1928.

1,674,606

UNITED STATES PATENT OFFICE.

JOHN MOSCRIP, OF TAMPA, FLORIDA.

GRAPEFRUIT CORER.

Application filed May 31, 1927. Serial No. 195,528.

The object of my invention is to provide a novel grapefruit corer which can be manufactured at relatively small cost and which will be efficient in removing the core of grapefruit or other citrus fruits.

I attain the objects of my invention by the device illustrated in the accompanying drawings, in which—

Like numerals designate like parts in each of the several views.

Figure 1:
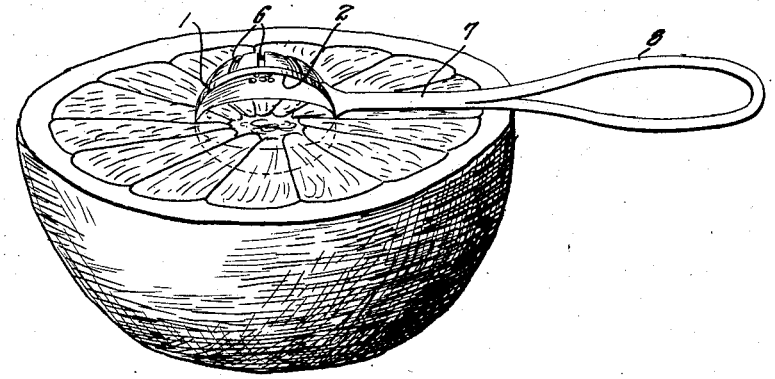
Figure 1 is a perspective view of my invention in use.
Figure 2:
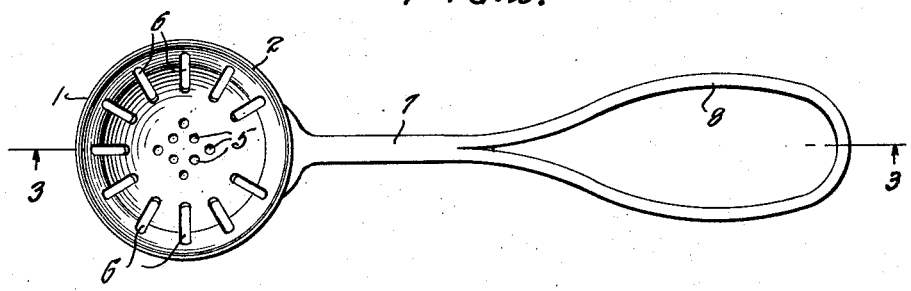
Figure 2 is a top plan of same.
Figure 3:
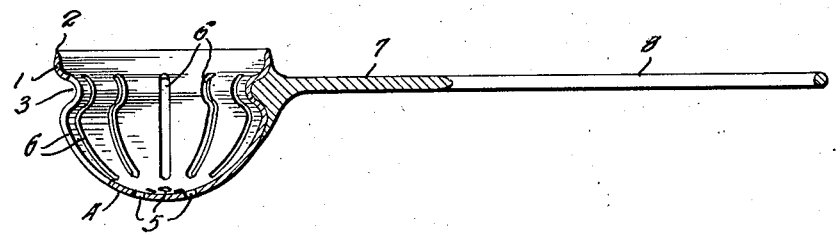
Fig. 3 is a longitudinal section on line 3—3 of Fig. 2.

Referring to the accompanying drawings, I provide a bowl 1 having a handle 7 attached thereto at a point spaced substantially from the edge of the bowl and half to one-third way down on the body of the bowl. The handle 7 has an expanded or looped portion 8. The bowl 1 has an enlarged indentation 3 and terminates in a sub-bowl 4 which is provided with a plurality of openings 5. The main bowl 1 is also provided with slots 6. The edge 2 of the bowl is tapered to a sharp edge so that it will cut the fibres of the fruit readily.

In operating the device a combination scoop and cutting movement is used. The bowl 1 by means of the handle 7, is rotated about its imaginary center at the same time as it is pressed down and around the seeds and core in the scoop motion. Such combined motions serve to bring the sharpened edges of the bowl against the fibres of the fruit in a slicing-cutting motion rather than by a direct and not effective press-cut. The bowl by this means is caused to cut through the fruit in the manner illustrated in the drawings. The air in the bowl is expressed through the slots 6 and the bottom openings 5 on the downward or initial motion of the tool and also serve as outlets for the juice during and at the completion of the removal of the core. The enlarged indentation of the bowl functions to cause the bowl to press most of the juice out from the core, as the core is cut out from the fruit, the slots 6 permitting of free release of the juice as it is pressed out and the openings 5 in the bottom of the bowl also permitting of escape of the juice. The handle 7 is fixed to the bowl in a practical position about ⅜ of an inch from the cutting edge of the rim of the bowl.

What I claim is—

1. In a fruit corer, the combination of a bowl having an edge sharpened to sever the fibres of the fruit, an enlarged indentation in the bowl, slots in the bowl for the escape of juice, a sub-bowl to receive the pulp from which the juice has been pressed by passage of the ring-like indentation, also having openings in the bottom for the escape of the juice, and a handle attached to the bowl.

2. In a fruit corer, the combination of a bowl having an edge sharpened to sever the fibres of the fruit, an enlarged indentation in the bowl, slots in the bowl for the escape of juice, a sub-bowl having openings in the bottom thereof for the escape of juice, and a handle attached to the bowl at a point spaced substantially distant from the cutting edge of the bowl.

3. In a grapefruit corer, the combination of a bowl of suitable size to remove the core of the fruit with a combined scoop and cutting motion; said bowl having a sharpened edge, the bowl having a plurality of slots in its sides for the escape of juice and having a plurality of perforations in its bottom for the escape of juice but retaining the seeds, and a handle affixed to the bowl at a point substantially distant from the cutting edge of the bowl to facilitate operation of the device.

4. In a grapefruit corer, the combination of a bowl having an enlarged indentation of suitable size to remove the core of the fruit with a combined scoop and cutting motion, said bowl having a sharpened edge, the bowl having a plurality of slots in its sides for the escape of juice, the seeds being retained, and a handle affixed to the bowl at a point substantially distant from the cutting edge of the bowl to facilitate operation of the device.

JOHN MOSCRIP.